(12) United States Patent
Chen

(10) Patent No.: US 6,757,079 B1
(45) Date of Patent: Jun. 29, 2004

(54) METHOD AND APPARATUS FOR FORMING MULTI-LEVEL DITHER IMAGES FROM AN INPUT DIGITAL IMAGE

(75) Inventor: Li-ming Chen, Keelung (TW)

(73) Assignee: Sunplus Technology Co., Ltd. (TW)

( * ) Notice: Subject to any disclaimer, the term of this patent is extended or adjusted under 35 U.S.C. 154(b) by 0 days.

(21) Appl. No.: 09/524,289

(22) Filed: Mar. 13, 2000

(51) Int. Cl.$^7$ .............................................. G06K 9/36
(52) U.S. Cl. ................................. 358/3.05; 358/3.03
(58) Field of Search ..................... 358/2.9, 3.03–3.05, 358/3.06, 3.13–3.19, 534–536; 382/237

(56) References Cited

U.S. PATENT DOCUMENTS

| | | | |
|---|---|---|---|
| 4,547,811 A | * 10/1985 | Ochi et al. | 382/176 |
| 5,101,283 A | * 3/1992 | Seki et al. | 358/3.13 |
| 5,101,443 A | * 3/1992 | Behrmann-Poitiers | 382/299 |
| 5,150,428 A | * 9/1992 | Leone et al. | 382/270 |
| 6,608,701 B1 | * 8/2003 | Loce et al. | 358/3.09 |

* cited by examiner

Primary Examiner—Thomas D. Lee
Assistant Examiner—Stephen Brinich
(74) Attorney, Agent, or Firm—Lowe Hauptman Gilman & Berner LLP (57) ABSTRACT

A method and apparatus for forming multi-level dither images from an input digital image are disclosed. The difference between a pixel value of the input digital image and a pixel value of a dither image corresponding to the input digital image is first determined. Next, the difference is processed by an error filter to correct the pixel value of the input digital image to generate a corrected image pixel value. The corrected image pixel value is then compared to at least two threshold values, each corresponding to a pixel value of the dither image, to determine a threshold value that is nearest to the corrected image pixel value, thereby obtaining a pixel value of the dither image corresponding to said threshold value.

9 Claims, 8 Drawing Sheets

METHOD AND APPARATUS FOR FORMING MULTI-LEVEL DITHER IMAGES FROM AN INPUT DIGITAL IMAGE

BACKGROUND OF THE INVENTION

1. Field of the Invention

The present invention relates to the field of image rendering system and, more particularly, to a method and apparatus for forming multi-level dither images from an input digital image.

2. Description of Related Art

Figure 6:
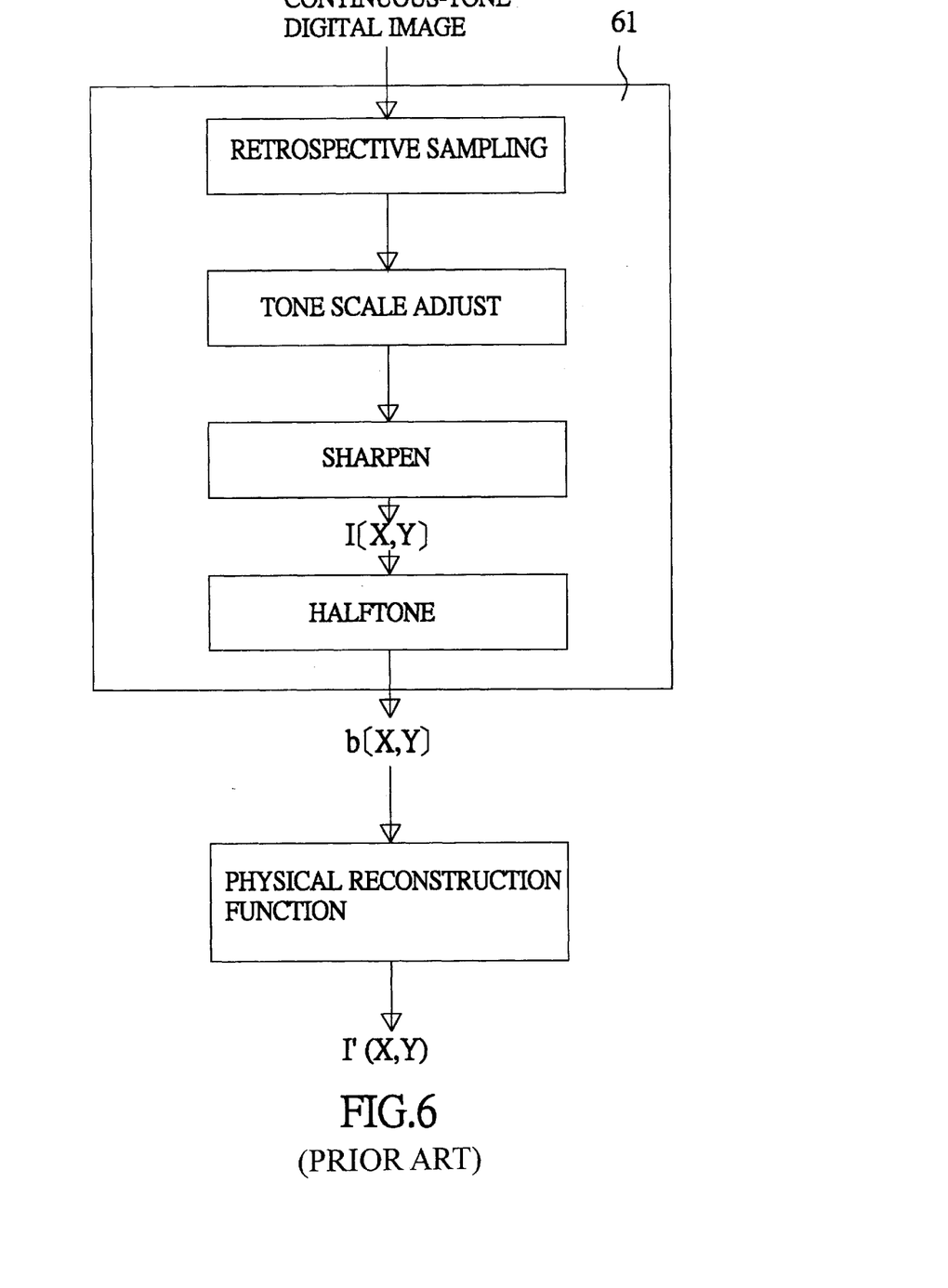
FIG. 6 is the functional block diagram of the conventional image rendering system.

Currently, the halftone method is in wide spread use to print an image by transforming a gray-level image into a binary image in which every pixel is represented by one bit. FIG. 6 shows a general image rendering system, wherein a continuous-tone digital image is processed by a display preprocessor 61 for being transformed into a binary discrete-space image b[x,y]. This binary discrete-space image is entered to a physical reconstruction function element of a binary display device, such as an LCD display or a printer, in order to produce a continuous-space visual image I'(x, y) output. The display preprocessor 61 primarily applies retrospective re-sampling, tone scale adjust, and sharpen processes to the input continue-tone digital image to produce a continuous-tone digital image I[x, y], which is then processed by a halftone algorithm to produce the binary discrete-space image.

As well known to those skilled in the art, the halftone algorithm can generally be classified into two categories, ordered dither and error diffusion. The ordered dither algorithm generates a pixel $b_{xy}(1 \leq x, y \leq n)$ of a binary dither image by thresholding the pixel $I_{xy}(1 \leq x, y \leq n)$ at coordinate (x, y) of an original continuous-tone image to a position-dependent set of thresholds. The set of thresholds is constrained to an n×n dither matrix D(n). The choice of matrix element values and their geometrical arrangement in the matrix determines the resultant image quality. A matrix element $D_{ij}(n)$ can be selected based on the coordinate of the pixel being evaluated: i=x modulo n and j=y modulo n. The decision to pixel $I_{xy}$ is:

$$\text{If } I_{xy} \geq D_{ij}(n), \text{ then } b_{xy} = 1,$$
$$\text{else } b_{xy} = 0,$$

where 1 and 0 represent the white color and black color, respectively. As a result, a binary dither image corresponding to the continuous-tone image can be generated. The quality of such a binary dither image is decided by the patterns of the elements in the dither matrix. Therefore, it is likely to produce visual dither patterns in the binary dither image, which negatively influence the image quality.

The error diffusion algorithm receives its name by diffusing the difference, which is known as an error, between the original and the corresponding dither pixels to their neighbors. The resultant gray-level image can be rendered with better visual quality by introducing blue noise into continuous-tone image with neighborhood operations.

Figure 7:
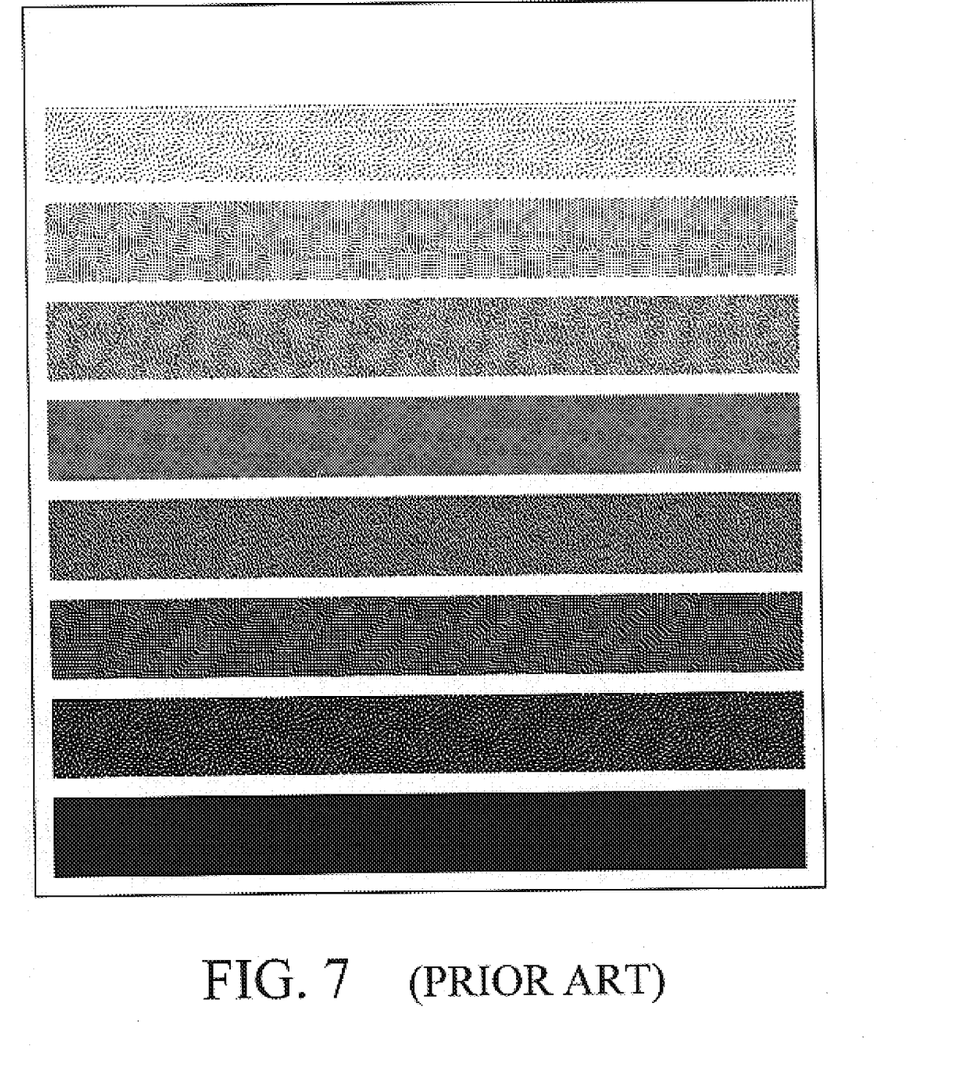
FIG. 7 is a gray-level diagram generated by the conventional halftone method.

The above conventional methods are primarily used to render 1-bit dither images. FIG. 7 is an actual gray-level diagram (the gray-level values from top to down are 255, 224, 192, 160, 128, 96, 64, 32 and 0). In order to apply those methods to generate multi-level dither images, it is necessary to expand the number of bits that represent the image pixel. In the conventional skill, U.S. Pat. No. 5,689,586 granted to Lin for a "Methods to Print N-tone Images with Multi-leveling Techniques", U.S. Pat. No. 5,416,481 granted to Chen for a "Analog-to-digital Converter with Multi-level Dither Current Input" and U.S. Pat. No. 5,742,405 granted to Spaulding et al. for a "Method and System for Forming Multi-level Halftone Images from an Input Digital Image" disclose the techniques related to generate multi-level dither images. However, these known techniques are evolved from expanding the 1-bit ordered dither algorithm. Therefore, the problem of creating visual dither patterns is hard to overcome, and the produced image quality is unsatisfactory. Accordingly, there is a need to have a novel design for forming multi-level dither images to mitigate and/or obviate the aforementioned problems.

SUMMARY OF THE INVENTION

The object of the present invention is to provide a method and apparatus for forming multi-level dither images from an input digital image with a simple structure, which can transform an m-bit gray-level image to an n-bit image (m≧n) to make the n-bit dither image look as much like the higher resolution m-bit digital image as possible, while having the visibility of minimized visual dither patterns for printing and display devices.

With this object in view, the present invention resides in a method for forming a multi-level dither image from an input digital image, which first executes a step (A) to determine the difference between a pixel value of the input digit image and a pixel value of a dither image corresponding to the input digital image. Next, in step (B), the difference is processed by an error filter to correct the pixel value of the input digit image, thereby generating a corrected image pixel value. Then, step (C) is executed to compare the corrected image pixel value to at least two threshold values, each corresponding to a pixel value of the dither image, to determine a threshold value that is nearest to the corrected image pixel value, thereby obtaining a pixel value of the dither image corresponding to the threshold value. Steps (A) to (C) are repeated until all pixels of the input digit image have been transformed into pixels of the dither image.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
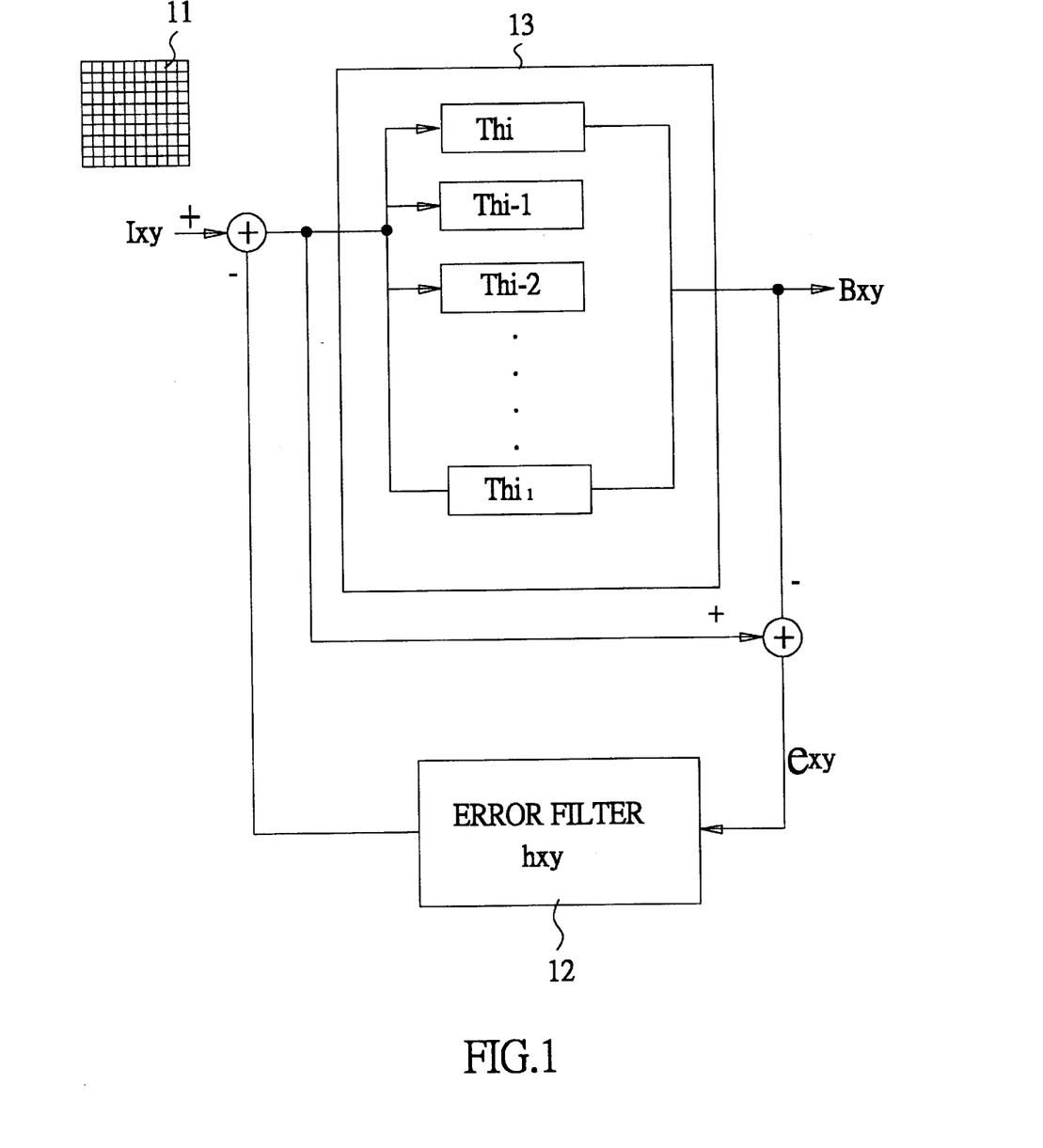
FIG. 1 is the functional block diagram of the present invention.

Referring now to FIG. 1, there is illustrated a schematic diagram of the present invention for forming a multi-level dither image from an input digital image 11. The input digital image 11 includes a plurality of points arranged in a matrix form, each point having a pixel value. The pixel value $I_{xy}$ of the point at coordinate (x,y) of the input digital input image 11 is compared with multiple threshold values $Th_i$ ($1 \leq i \leq N$) of a multi-threshold device 13 for being transformed to a corresponding pixel value of the Bxy of the multi-level dither image. The pixel value $I_{xy}$ of the input digital image 11 subtracts the corresponding pixel value $B_{xy}$ of the dither image in order to determine a difference value $e_{xy}$; that is:

$$e_{xy} = I_{xy} - B_{xy}. \tag{1}$$

This difference $e_{xy}$ is suitably called an error for coordinate (x,y). The difference $e_{xy}$, consisting of past error values, is passed through an error filter 12 for being processed by $$\sum_{(k,l) \in S} h_{kl} e_{x-k, y-l}$$

to produce a correction factor. In the processing, the range of the indices (k,l) is defined by pre-selected adjacent points S of the pixel $I_{xy}$ of the input digital image. The coefficients of the error diffusion kernel $h_{kl}$ define the relative contributions of the previously computed errors to a corrected pixel value, and must satisfy the following condition:

$$h_{kl} \geq 0 \text{ and } \sum_{(k,l) \in S} h_{xy} = 1. \tag{2}$$

Therefore, the error is diffused over the weighted adjacent points without being amplified or reduced.

The correction factor is used to correct future input pixel value $I_{xy}$ of the input digital image 11 in order to derive a corrected image pixel value $I_{xy}'$; that is:

$$I_{xy}' = I_{xy} - \sum_{(k,l) \in S} h_{kl} e_{x-k, y-l}. \tag{3}$$

The corrected image pixel value $I_{xy}'$ is compared with the multiple threshold value $Th_1$, each corresponding to a dither image pixel value $M_i$, such that, when $Th_{i-j} \leq I_{xy}' \leq Th_{i-j+1}$ ($0 \leq j \leq i$), a corresponding dither image pixel value $M_{i-j}$ is assigned to be the pixel value $B_{xy}$ of the dither image. In details, each pixel value $B_{xy}$ of the dither image is determined to form the dither image according to the following rule:

$$\begin{aligned}
\text{If} \quad & I_{xy}' \geq Th_i, \quad B_{xy} = M_i; \\
\text{elseif} \quad & I_{xy}' \geq Th_{i-1}, \quad B_{xy} = M_{i-1}; \\
\text{elseif} \quad & I_{xy}' \geq Th_{i-2}, \quad B_{xy} = M_{i-2}; \\
& \ldots \\
\text{elseif} \quad & I_{xy}' \geq Th_1, \quad B_{xy} = M_1; \\
\text{else} \quad & B_{xy} = M_0.
\end{aligned} \tag{4}$$

Accordingly, the error $e_{xy}'$ at coordinate (x, y) can be derived from the following equation:

$$e_{xy}' = I_{xy}' - B_{xy}. \tag{5}$$

Thus, the succeeding pixel value $I_{xy}'$ can be generated and, by repeating (1)~(5), a multi-level error diffusion process can be performed to generate a multi-level dither image.

Figure 2A:
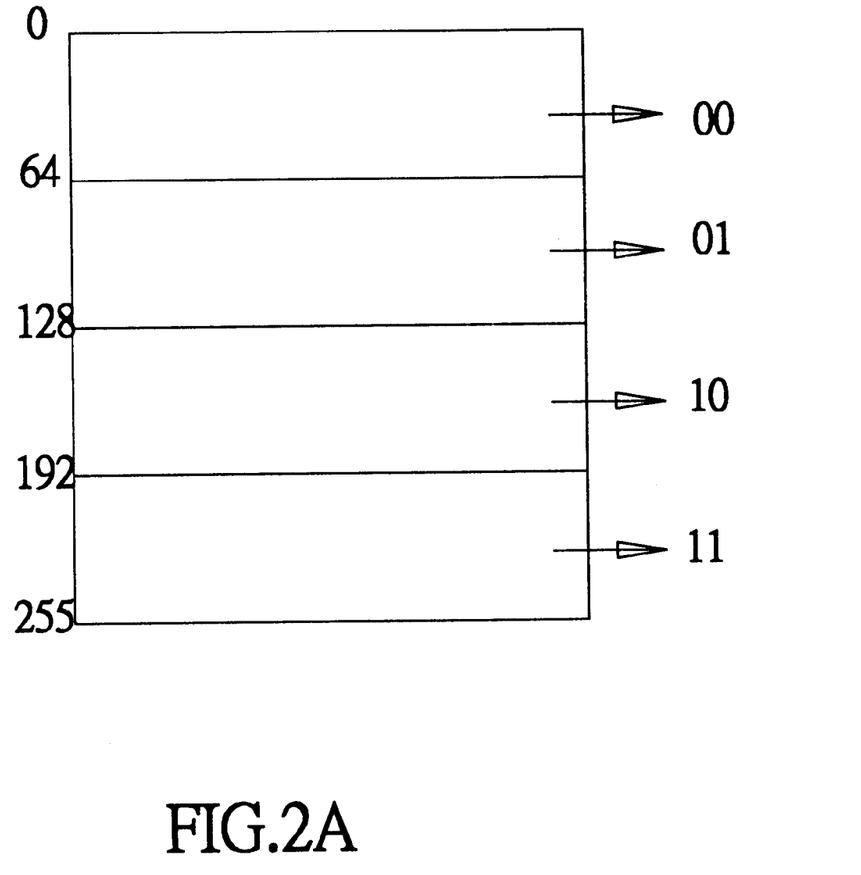
FIG. 2A schematically illustrates an example of the present invention in applying to an 8-bit image rendering system with 3 threshold values.
Figure 2B:
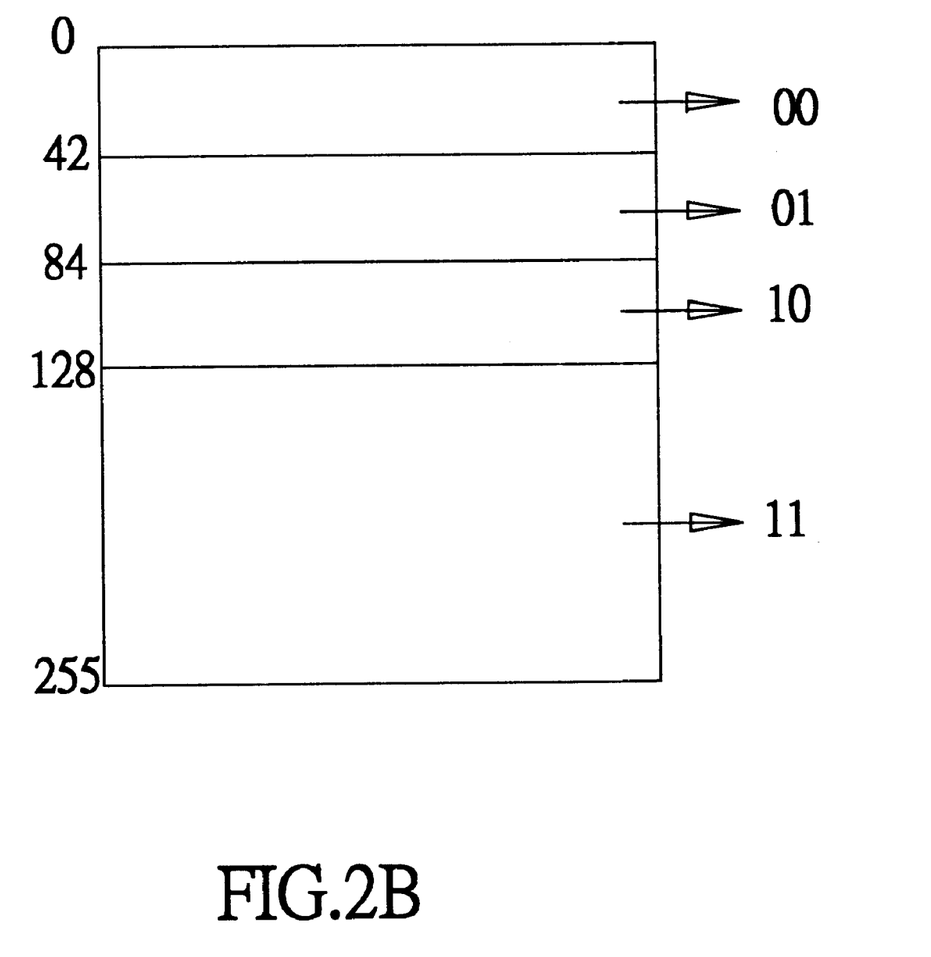
FIG. 2B schematically illustrates another example of the present invention in applying to an 8-bit image rendering system with 3 threshold values.
Figure 3:
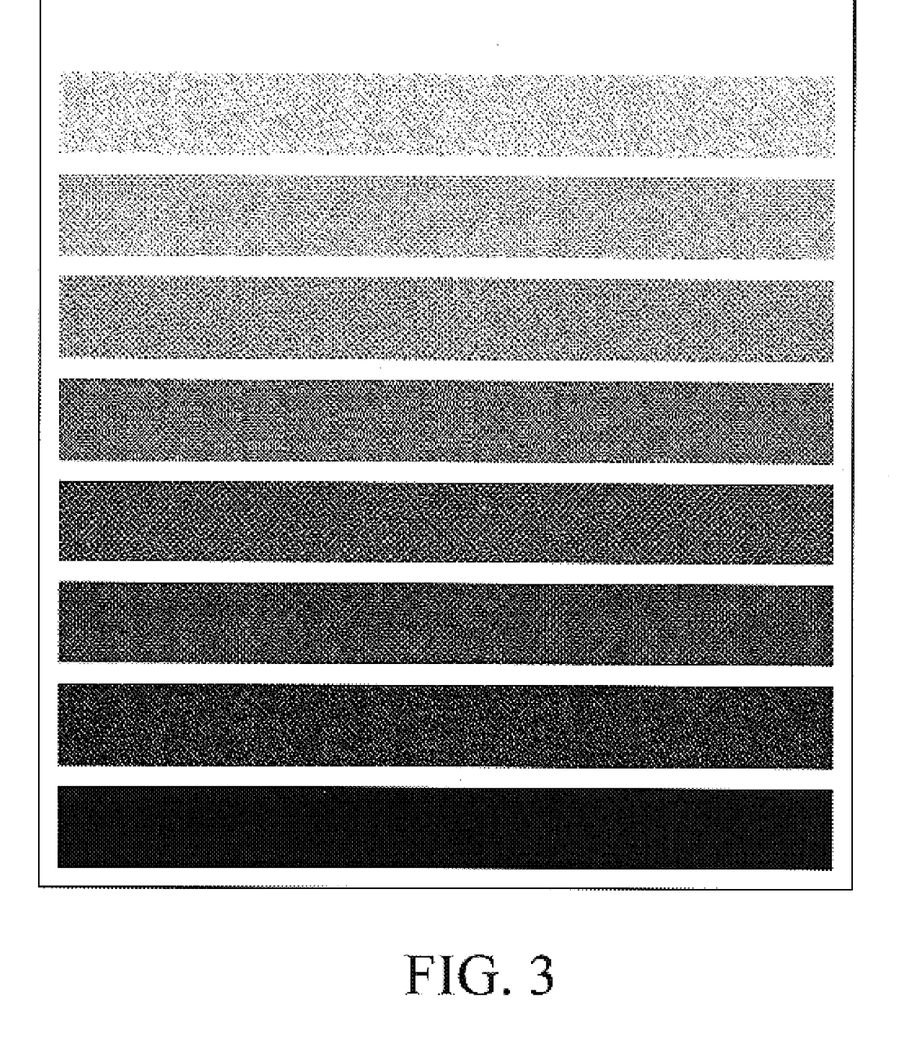
FIG. 3 is a gray-level diagram printed from the example shown in FIG. 2A.
Figure 4:
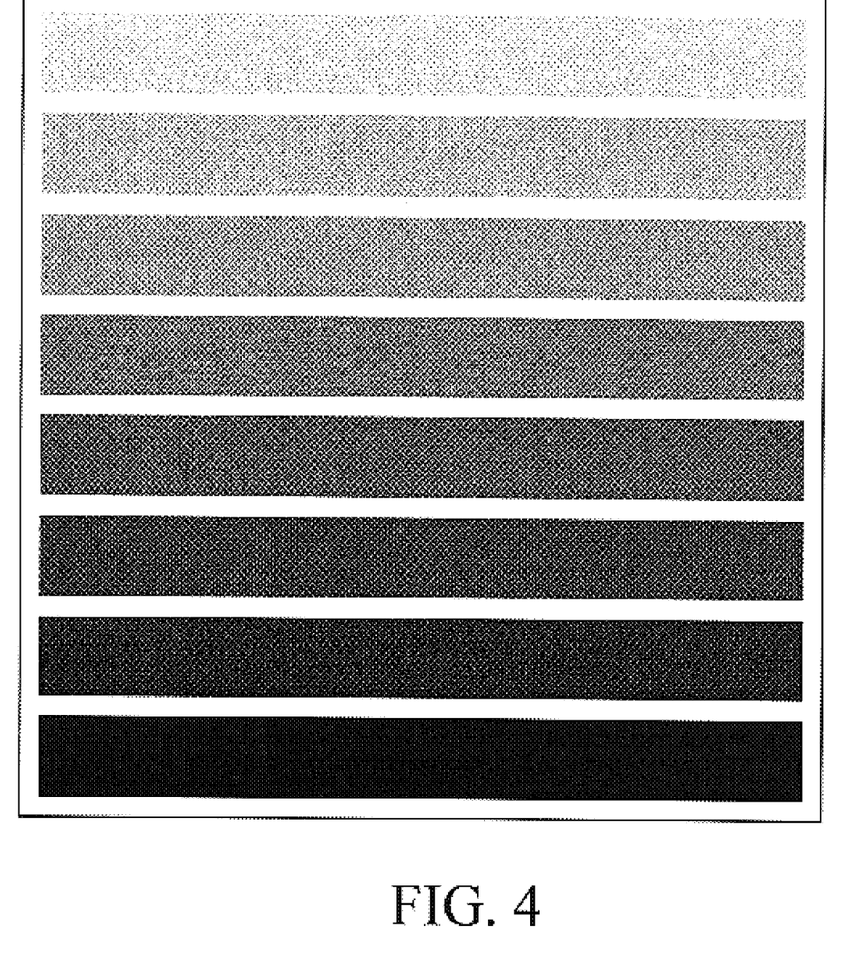
FIG. 4 is a gray-level diagram generated by the present invention for a 3-bit dither image with 8-bit input and 7 threshold values.
Figure 5:
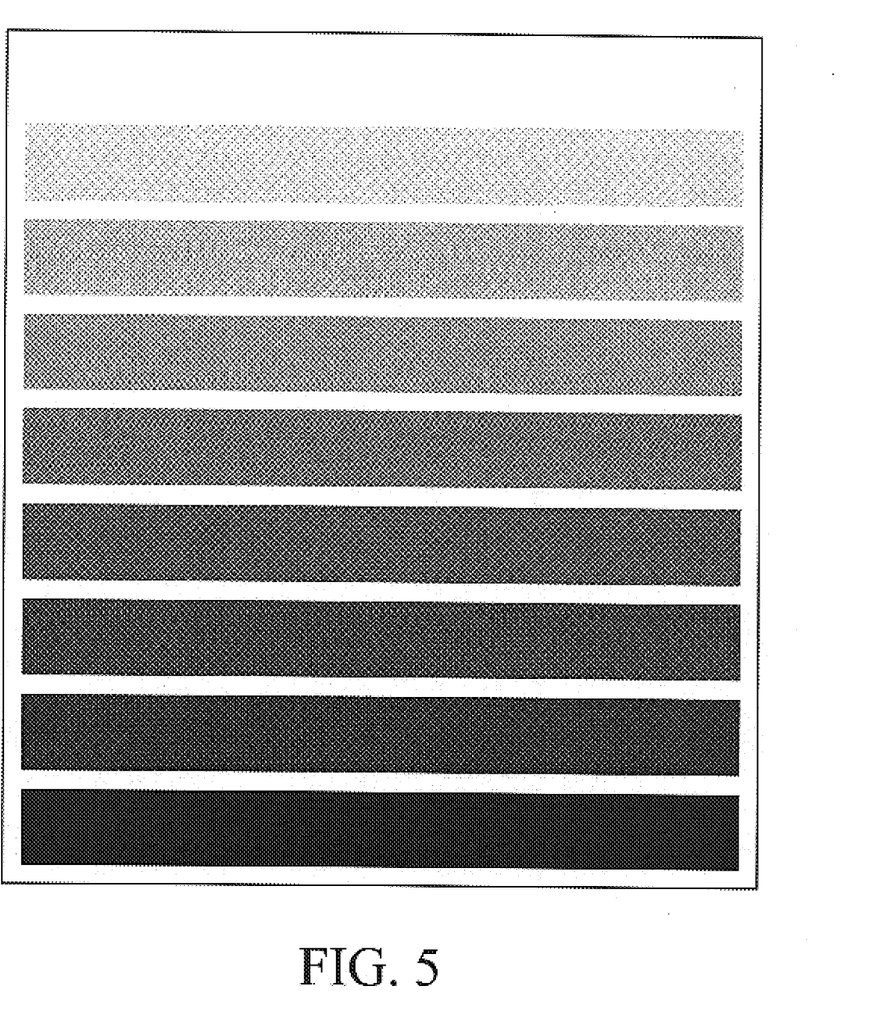
FIG. 5 is a gray-level diagram generated by the present invention for a 4-bit dither image with 8-bit input and 15 threshold values.

FIG. 2A illustrates a practical example of the present invention. It is assumed that the method is applied to an 8-bit image rendering system with three threshold values. The pixel value of an image is thus in the range of 0~255. The three threshold values are selected to be 192, 128 and 64, such that the range of the pixel value is equally divided into four portions corresponding to four pixel values of 11, 10, 01 and 00 of a multi-level dither image, respectively. Therefore, an m-bit gray-level image can be suitably transformed to an n-bit image ($m \geq n$, in this example, m=8 and n=2), and it makes the n-bit dither image look as much like the higher resolution m-bit digital image as possible. FIG. 3 is an actual gray scale ramp diagram printed by this example (the gray-level values from top to bottom are 255, 224, 192, 160, 128, 96, 64, 32 and 0). FIG. 4 and FIG. 5 are the gray scale ramp diagrams printed under the conditions of n=3 and n=4, respectively. It is illustrated that the dither images generated by the present invention do offer better visual effect. In addition, the threshold values of the present invention can be arbitrarily selected depending on the character of the output device to unequally partition the range of the pixel value, thereby emphasizing the gray-level image of particular portions. With reference to FIG. 2B, there is shown an example similar to that of FIG. 2A, with the exception of the threshold values being selected to be 128, 84 and 42. Accordingly, the range of the pixel value is not equally divided and thus the low gray-level images can be particularly emphasized.

From the above descriptions, it is appreciated that the method and apparatus for forming a multi-level dither image from an input digital image in accordance with the present invention are suitably adopted to multi-level printing or display devices to generate better quality dither images without producing the undesired visual pattern effect caused by the ordered dither method. Furthermore, because only a small amount of image data is kept in memory, the hardware implementation is feasible, and the cost is low. In addition, by properly selecting the threshold values, any multi-level dither image of n bits or less than n bits can be obtained.

Although the present invention has been explained in relation to its preferred embodiment, it is to be understood that many other possible modifications and variations can be made without departing from the spirit and scope of the invention as hereinafter claimed.

What is claimed is:

1. A method for forming a multi-level dither image from an input digital image, comprising the steps of:

(A) determining the difference between a pixel value of said input digital image and a pixel value of a dither image corresponding to said input digital image;

(B) processing said difference by an error filter to correct the pixel value of said input digital image to generate a corrected image pixel value; and (C) comparing said corrected image pixel value to at least two threshold values respectively representing a predetermined dither image pixel value, to determine a threshold value that is nearest to said corrected image pixel value thereby obtaining a pixel value of said dither image corresponding to said threshold value, and repeating steps (A) to (C) until all pixels of said input digital image have been transformed into pixels of said dither image.

2. The method for forming a multi-level dither image from an input digital image as claimed in claim 1, wherein in step (A), the pixel value of said input digital image is $I_{xy}$, the pixel value of said dither image being $B_{xy}$, said difference being $e_{xy} = i_{xy} - B_{xy}$.

3. The method for forming a multi-level dither image from an input digital image as claimed in claim 2, wherein in step (B), said corrected image pixel value is $$I'_{xy} = I_{xy} - \sum_{(k,l) \in S} h_{kl} e_{x-k, y-1},$$

where S represents pre-selected adjacent points of the pixel of said input digital image and $h_{kl}$ represents coefficients of an error diffusion kernel of said error filter, which satisfies conditions of $$h_{xy} \geq 0 \text{ and } \sum_{(k,l) \in S} h_{xy} = 1.$$

4. The method for forming a multi-level dither image from an input digital image as claimed in claim 3, wherein in step (C), said corrected image pixel value $I_{xy}'$ is compared with N threshold values $Th_i$ ($1 \leq i \leq N$), such that, when $Th_{i-j} \leq I_{xy}' \leq Th_{i-j+1}$ ($0 \leq j \leq i$), a corresponding image pixel value $M_{i-j}$ is assigned to the pixel value of said dither image $B_{xy}$.

5. An apparatus for forming a multi-level dither image from an input digital image, comprising:
   means for determining the difference between a pixel value of said input digital image and a pixel value of a dither image corresponding to said input digital image;
   an error filter for processing said difference to produce a correction factor;
   means for correcting the pixel value of said input digital image by said correction factor to generate a corrected image pixel value; and
   multi-threshold device having at least two threshold values respectively representing a predetermined dither image pixel value, for comparing with said corrected image pixel value to determine a threshold value that is nearest to said corrected image pixel value, thereby obtaining a pixel value of said dither image corresponding to said threshold value.

6. The apparatus for forming a multi-level dither image from an input digital image as claimed in claim 5, wherein the means for determining the difference subtracts the pixel value of said dither image from the pixel value of said input digital image to deduce said difference.

7. The apparatus for forming a multi-level dither image from an input digital image as claimed in claim 6, wherein said error filter produces a correction factor of $$\sum_{(k,l) \in S} h_{kl} e_{x-k, y-1},$$

where S represents pre-selected adjacent points of the pixel of said input digital image, $e_{x-k, y-1}$ representing a difference value, $h_{kl}$ representing coefficients of an error diffusion kernel of said error filter, which satisfies conditions of $$h_{xy} \geq 0 \text{ and } \sum_{(k,l) \in S} h_{xy} = 1.$$

8. The apparatus for forming a multi-level dither image from an input digital image as claimed in claim 7, wherein the means for correcting the pixel value subtracts said correction factor from the pixel value of said input digit image to obtain said corrected image pixel value.

9. The apparatus for forming a multi-level dither image from an input digital image as claimed in claim 8, wherein said multi-threshold device has N threshold values $Th_i$ ($1 \leq i \leq N$) for comparing with said corrected image pixel value $I_{xy}'$ in such a manner that, when $Th_{i-j} \leq I_{xy}' \leq Th_{i-j+1}$ ($0 \leq j \leq i$), a corresponding image pixel value $M_{i-j}$ is assigned to the pixel value of said dither image.

* * * * *